WILLIAM HENRY HANNAN.

Assignor to WILLIAM HERBERT HANNAN.

THILL COUPLING.

No. 11,260. Reissued Aug. 16, 1892.

Witnesses:
Friedrich, Gustav, Wilhelm.
Theo L. Popp.

W. H. Hannan Inventor.
By Wilhelm v. Bonnet
Attorneys.

UNITED STATES PATENT OFFICE.

WILLIAM HENRY HANNAN, OF SYRACUSE, NEW YORK, ASSIGNOR TO WILLIAM HERBERT HANNAN, OF SAME PLACE.

THILL-COUPLING.

SPECIFICATION forming part of Reissued Letters Patent No. 11,260, dated August 16, 1892.

Original No. 456,117, dated July 14, 1891. Application for reissue filed September 2, 1891. Serial No. 404,565.

*To all whom it may concern:*

Be it known that I, WILLIAM HENRY HANNAN, of Syracuse, in the county of Onondaga, in the State of New York, have invented new and useful Improvements in Thill-Couplings, of which the following, taken in connection with the accompanying drawings, is a full, clear, and exact description.

This invention is a specific improvement of the thill-coupling for which I have obtained United States Letters Patent No. 341,235, dated May 4, 1886.

The object of my present invention is to provide the thill-coupling with a locking device which shall be more secure and reliable in its operation and capable of compensating for the wear and abrasion of the coupling-pin and draft-eye; and to that end the invention consists in the improved construction and combination of parts, as hereinafter more fully described, and set forth in the claims.

Figure 1:
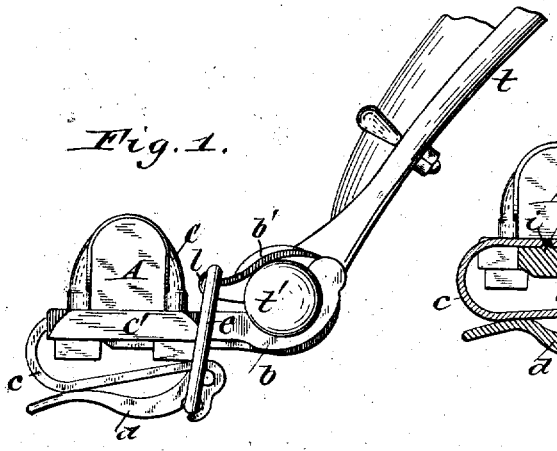
Figure 3:
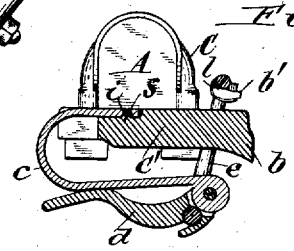
Figure 2:
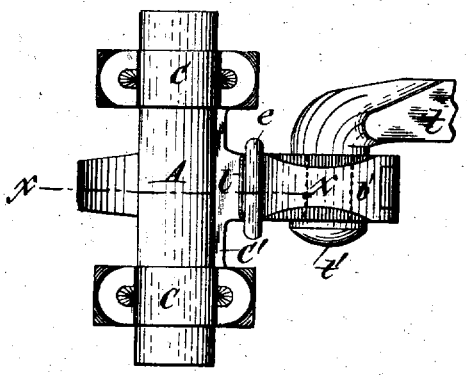
Figure 4:
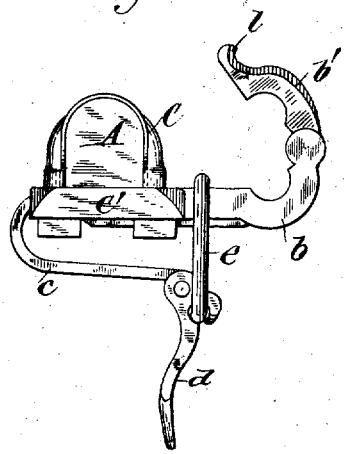
Figure 5:
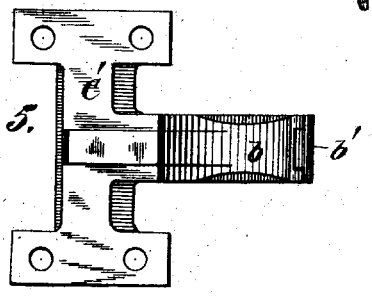

In the annexed drawings, Figure 1 is a side view of a thill-coupling embodying my improvements. Fig. 2 is a top plan view of the same. Fig. 3 is a vertical longitudinal section on line *x x*, Fig. 2. Fig. 4 is a side view of the draft-eye in its open position, and Fig. 5 is an inverted plan view of the clip-tie.

Similar letters of reference indicate corresponding parts.

A represents the front axle of a vehicle. To the under side of said axle, near each end thereof, is applied a clip-tie C′, which is elongated in the direction lengthwise of the axle and is doubly secured thereto by two clips C C, embracing the axle and fastened to the two ends of the clip-tie in the usual and well-known manner. This clip-tie is formed at the center of its length with the forwardly-extending fixed lower section *b* of the draft-eye and to the front of said section is hinged the upper draft-eye section *b′*, the rear end of which is formed with an upwardly-curved lip *l*.

*t* represents the thill-iron, which has either rigidly attached to or formed integral with it the coupling-pin projecting laterally from the thill-iron, as indicated by dotted lines in Fig. 2 of the drawings, and terminated with a head *t′*. Between the central portion of the clip-tie C′ and under side of the axle A is clamped one end of a spring-arm *c*, and preferably secured in position by a spur *s* on top of the clip-tie entering a recess *i* in the under side of the spring-arms, as shown in Fig. 3 of the drawings, said spring-arm extending from the rear of the clip-tie and thence forward underneath the same and has hinged to its free end a cam-lever *d*, which moves in a vertical plane. To this cam-lever, at a point eccentric to the hinge thereof, is connected a suitable tie, preferably of the form of a bail *e*, which embraces the rear portions of the draft-eye sections *b* *b′* and is adapted to lie with its top cross-bar on the lip *l* of the hinged eye-section *b′*, as illustrated in Figs. 1 and 2 of the drawings.

When the thill is detached from the vehicle, the cam-lever *d* is swung forward and the hinged eye-section *b′*, which is thus released from the tie or bail *e*, is swung forward, as represented in Fig. 4 of the drawings. To couple the thill to the vehicle, the coupling-pin of the thill-iron is laid in the fixed draft-eye section *b*. Then the hinged eye-section is swung back upon the coupling-pin, the bail *e* placed upon the lip *l*, and then by drawing or pushing the free end of the cam-lever rearward it is caused to draw down the bail *e*, which by its bearing upon the lip *l* presses the hinged eye-section *b′* tightly upon the coupling-pin with the force exerted by the spring-arm *c*. After the cam-lever is carried past the center of its movement it automatically springs rearward by the force of the spring-arm, and thus becomes sufficiently locked to prevent its accidental displacement. The constant pressure of the spring-arm effectually prevents the rattling of the thill-coupling and automatically compensates for the wear and abrasion of the coupling-pin and draft-eye.

Having described my invention, what I claim as new, and desire to secure by Letters Patent, is—

1. The combination, with the draft-eye composed of a fixed section and a movable section, of a spring-arm secured at one end and free at the other, a cam-lever pivoted to the free end of said spring-arm, and a tie attached to the cam-lever outside of its fulcrum and connecting the cam-lever with the movable section of the draft-eye, whereby the spring-arm exerts a constant pressure upon the movable section and also holds the cam-lever yieldingly in a locked position, substantially as set forth.

2. The combination, with the axle, of a draft-eye composed of a forwardly-projecting fixed section and a movable section hinged to the front end of the fixed section, a spring-arm secured to the axle and projecting forwardly therefrom, a cam-lever hinged to the free front end of the spring-arm, and a tie attached to the cam-lever outside of its fulcrum and connecting the cam-lever with the hinged section of the draft-eye, substantially as set forth.

3. In combination with the axle-clip, coupling-pin, fixed lower draft-eye section *b*, and the upper eye-section *b'*, hinged to the front of the fixed section, the spring-arm *c*, secured at one end to the clip-tie and extending from the rear thereof forward underneath the same, the cam-lever *d*, hinged to the free end of said spring-arm, and the bail *e*, connected to the cam-lever and adapted to engage the rear end of the hinged eye-section, substantially as set forth.

4. The combination, with the front axle and thill-iron, of the clip-tie C', elongated in the direction lengthwise of the axle and formed at the center of its length with the draft-eye section *b*, axle-clips C C, secured to the two ends of said clip-tie, the draft-eye section *b'*, hinged to the eye-section *b*, the spring-arm clamped between the central portion of the clip-tie and extending from the rear of the clip-tie underneath the same and forward therefrom, the cam-lever *d*, hinged to the free end of said spring-arm, and the bail *e*, connected to said cam-lever and adapted to bear on top of the rear end of the hinged draft-eye section, substantially as described and shown.

In testimony whereof I have hereunto signed my name this 26th day of August, 1891.

WILLIAM HENRY HANNAN.

Witnesses:
THEO. L. POPP,
JENNIE CLOUGH.